US011610352B2

(12) United States Patent
Braff

(10) Patent No.: US 11,610,352 B2
(45) Date of Patent: Mar. 21, 2023

(54) MULTISTATE ANIMATION OF EXISTING DIGITAL AND ANALOG ART

(71) Applicant: Liquid Canvas LLC, San Rafael, CA (US)

(72) Inventor: Mitchell Braff, San Rafael, CA (US)

(73) Assignee: Liquid Canvas LLC, San Rafael, CA (US)

( * ) Notice: Subject to any disclaimer, the term of this patent is extended or adjusted under 35 U.S.C. 154(b) by 0 days.

(21) Appl. No.: 17/478,699

(22) Filed: Sep. 17, 2021

(65) Prior Publication Data
US 2022/0005243 A1 Jan. 6, 2022

Related U.S. Application Data

(63) Continuation of application No. 16/899,727, filed on Jun. 12, 2020, now Pat. No. 11,132,825.

(51) Int. Cl.
G06T 11/60 (2006.01)
G06N 20/00 (2019.01)
G06T 13/80 (2011.01)

(52) U.S. Cl.
CPC .............. G06T 11/60 (2013.01); G06N 20/00 (2019.01); G06T 13/80 (2013.01)

(58) Field of Classification Search
CPC .......... G06T 11/60; G06T 13/80; G06N 20/00
USPC ........................................................ 345/619
See application file for complete search history.

(56) References Cited

U.S. PATENT DOCUMENTS

| 10,789,754 | B2 | 9/2020 | Kim et al. | |
|---|---|---|---|---|
| 2002/0140706 | A1 | 10/2002 | Peterson et al. | |
| 2012/0300298 | A1* | 11/2012 | Yu | G02B 30/54 359/478 |
| 2014/0267342 | A1 | 9/2014 | Liu | |
| 2015/0371421 | A1* | 12/2015 | Hadfield | G01C 21/3881 345/589 |
| 2020/0035010 | A1 | 1/2020 | Kim et al. | |

* cited by examiner

Primary Examiner — Thomas J Lett
(74) Attorney, Agent, or Firm — Perkins Coie LLP; Andrew T. Pettit; Michael Glenn

(57) ABSTRACT

Introduced here are computer programs and associated computer-implemented techniques for adding animations to existing digital and analog art that was not originally created with animation in mind. The technologies described herein enable the content located beneath animated elements to be generated such that the artistic style of the underlying art remains intact.

20 Claims, 13 Drawing Sheets

300

301
Obtain a digital image to be used to create animated media

302
Receive first input indicative of a selection of an element in the digital image to be animated 303
Identify, based on the first input, background content in the digital image 304
Create a layered file in a graphics program by (i) placing the element on a foreground layer and (ii) placing the background content on a background layer 305
Receive second input indicative of an addition of content on the background layer directly beneath the element on the foreground layer 306
Receive third input indicative of a selection of an animation to be performed by the element 307
Associate the animation with the element such that as the animation occurs, the content added to the background layer is at least partially revealed

401
Receive first input indicative of a selection of a digital image to be used to create animated media

402
Cause the digital image to be imported from a memory into a graphics program

403
Receive second input indicative of a selection of a series of elements in the digital image to be animated

404
Create a layered file in the graphics program by (i) placing each element on a separate foreground layer and (ii) place all remaining content in the digital image on a background layer

405
Receive third input indicative of an addition of content on the background layer directly beneath the series of elements

406
Assign a series of animations to the series of elements such that each element is assigned an animation

407
Program the series of animations to be performed over an interval of time such that at least some of the content added to the background layer is revealed as the series of animations is performed by the series of elements

Generate an interface through which an individual is able to create animated media

502

Receive first input indicative of a request to post a digital image to the interface

503

Cause display of the digital image on the interface by placing corresponding pixels on a first layer addressable by a graphics program

504

Receive second input indicative of a selection of an element in the digital image to be animated

505

Define a segmented region of pixels corresponding to the element

506

Create a layered file by extracting the segmented region of pixels and then placing the segmented region of pixels on a second layer addressable by the graphics program

507

Receive third input indicative of an addition of content on the first layer within an empty area corresponding to the segmented region of pixels

508

Assign an animation to the element

509

Program the animation by assigning a temporal trigger to the segmented region of pixels

FIGURE 5

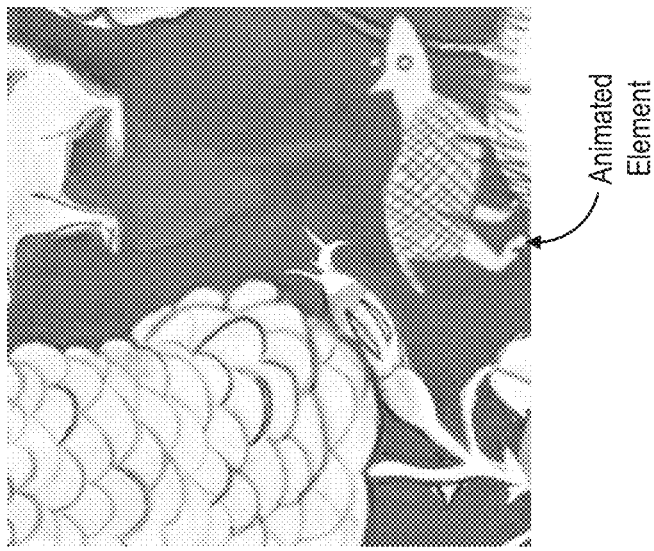
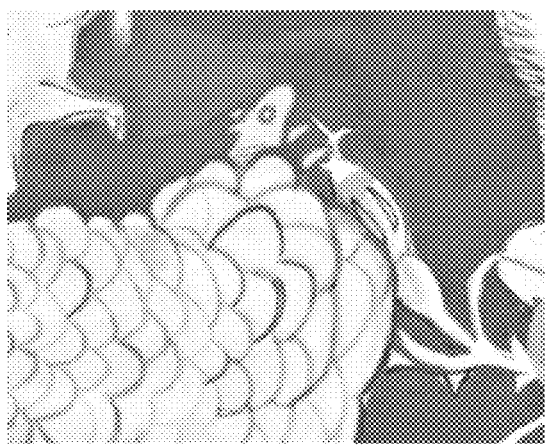
FIGURE 7C

MULTISTATE ANIMATION OF EXISTING DIGITAL AND ANALOG ART

CROSS-REFERENCE TO RELATED APPLICATIONS

This application is a continuation of U.S. patent application Ser. No. 16/899,727, titled "Multistate Animation of Existing Digital and Analog Art" and filed on Jun. 12, 2020 (now U.S. Pat. No. 11,132,825), the contents of which is incorporated by reference herein in its entirety.

TECHNICAL FIELD

Various embodiments concern computer programs and associated computer-implemented techniques for adding animations to existing digital and analog art that was not originally created with animation in mind.

BACKGROUND

The term "digital art" refers to artistic works that are created or presented using digital technology. Despite initial resistance, digital technology has had a tremendous impact on the production of art, including activities such as painting, drawing, and sculpting. Digital art may be generated purely by a computer or with the assistance of a human. For example, an individual may scan an existing piece of analog art for display, or an individual may create digital art using software that is executed by an electronic device.

Over the last several years, digital art has become increasingly commonplace as digital frames become more prevalent. The term "digital frame" refers to any display capable of presenting digital art. Examples of digital frames include televisions, computer monitors, home assistant devices, and digital photo frames. Entities have begun examining how to improve digital art in order to capitalize on improvements in these digital frames. For instance, the resolution and color gamut of these digital frames has greatly improved over time.

BRIEF DESCRIPTION OF THE DRAWINGS

This patent or application contains at least one drawing executed in color. Copies of this patent or application with color drawings will be provided by the Office upon request and payment of the necessary fee.

FIG. 3 depicts a flow diagram of a process for animating digital art in a realistic manner that remains faithful to the artistic style of the digital art.

FIG. 4 depicts a flow diagram of another process for animating digital art.

FIG. 5 depicts a flow diagram of a process for converting non-animated media into animated media.

FIGS. 7A-C include several frames from an animated media file based on "Green Dress" by Lauren McIntosh.

Figure 1:
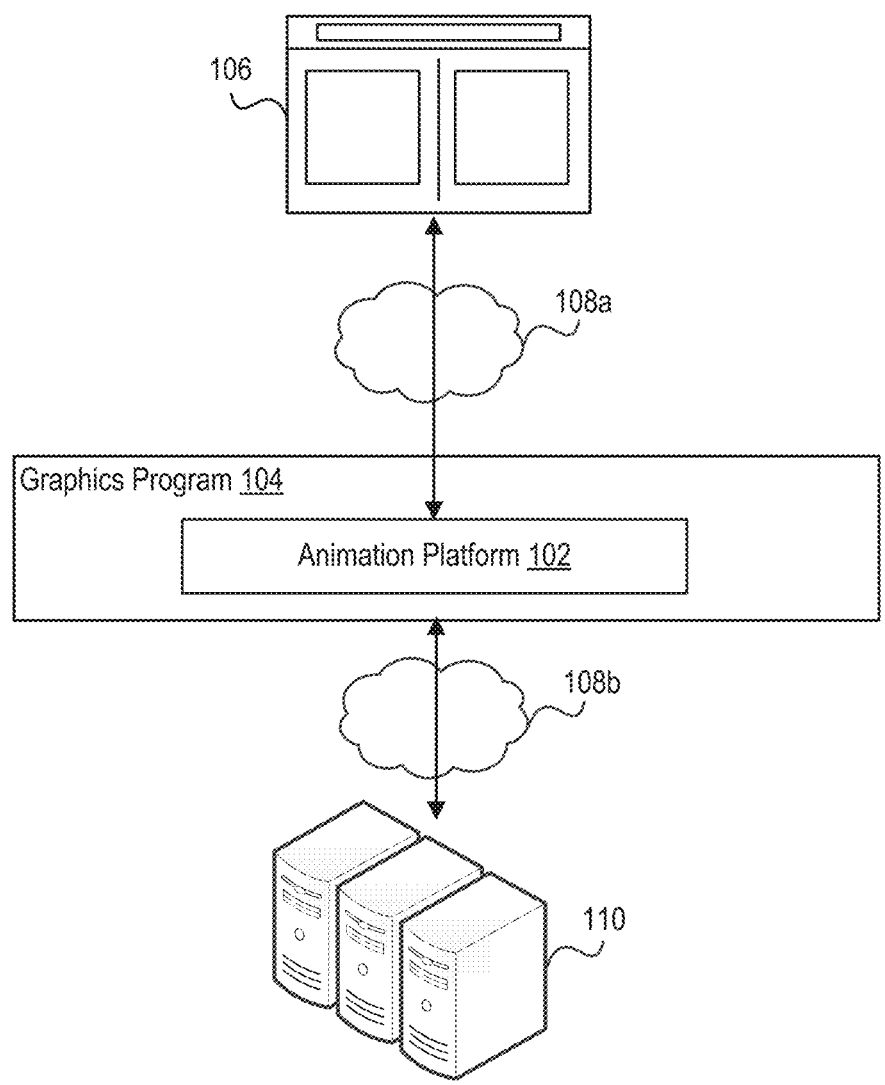
FIG. 1 illustrates a network environment that includes an animation platform.

Various features of the technologies described herein will become more apparent to those skilled in the art from a study of the Detailed Description in conjunction with the drawings. Embodiments of the technologies are illustrated by way of example and not limitation in the drawings. Accordingly, while a selection of embodiments are shown in the drawings, the technologies are amenable to various modifications. Those skilled in the art will recognize that other embodiments may be employed without departing from the principles of the technologies.

DETAILED DESCRIPTION

Traditional animation (also referred to as "cel animation" or "hand-drawn animation") required that each frame be drawn by hand. In a traditional animation process, animators began by drawing sequences of animations on sheets of a transparent medium, one frame at a time. While these animations were being drawn, artists painted the sets over which the action of each animated sequence took place. However, these artists would work closely with the animators to ensure that the resulting backgrounds were harmonious in tone with the characters and animations.

Digital art has become increasingly commonplace as digital frames become more prevalent, and some individuals have begun looking for ways to improve upon digital art. As an example, an individual may wish to add animations to an existing piece of digital art. As discussed above, in traditional animation, the background was represented using a single continual image while characters in the foreground were animated by changing the "cels" that overlaid the background. As the characters in the foreground were animated, different portions of the background were revealed. Animating existing pieces of digital art is difficult, however, since those pieces of digital art were not intended to be animated in the first place. At a high level, because all of the content included in an existing piece of digital art resides on a single layer, there is no background to be exposed when elements are animated in the foreground.

Some entities have attempted to address this problem using software that dynamically fills in the background where it did not previously exist. As an example, the colors of pixels located beneath an animated element may be interpolated based on the colors of nearby non-animated pixels (that is, pixels in the background). Such an approach may result in undesirable outcomes in some situations, however. For instance, assume that an existing piece of digital art includes a butterfly sitting on a branch of a tree. If an artist is interested in animating the butterfly moving from the tree to the grass below, then when the butterfly leaves the branch, the portion of the branch that was covered by the butterfly must be created since those pixels are not part of the existing piece of digital art. Thus, the appropriate color of each pixel located beneath the butterfly must be established. Otherwise, the silhouette of the butterfly would be visible when it moves. But employing interpolation may result in those pixels being colored green based on nearby pixels that correspond to leaves rather than blue to indicate the sky or brown to indicate a branch.

Introduced here, therefore, are computer programs and associated computer-implemented techniques for adding animations to existing digital and analog art that was not originally created with animation in mind. At a high level, the technologies described herein enable the background content located beneath animated elements to be generated to fill the "holes" left by animated elements in such a manner that the artistic style of the underlying art remains intact.

Initially, an animation processing platform (or simply "animation platform") can obtain a digital image to be used to create animated media. In some embodiments the digital image is representative of a high-resolution scan of analog art created using traditional artistic materials, while in other embodiments the digital image is produced in a graphics computer program (or simply "graphics program"). As further described below, the animation platform may be compatible with, or executed by, the graphics program.

Then, the animation platform can receive input indicative of selection(s) of foreground element(s) in the digital image that are to be animated. These foreground element(s) may be manually identified through the graphics program, or these foreground element(s) may be automatically identified based on analysis of the underlying art. For instance, the animation platform may apply a machine learning (ML) algorithm to the underlying art that is able to identify candidate elements for animation. Moreover, the animation platform can identify, based on the input, background content in the digital image that will not be animated.

The animation platform can then create a layered file in the graphics program by (i) placing the foreground element(s) on foreground layer(s) and (ii) placing the background content on a background layer. Normally, each foreground element is placed on a separate foreground layer. The foreground and background layers may be separately addressable by the graphics program.

Thereafter, the animation platform may receive input indicative of an addition of content to the background layer directly beneath each foreground element. Adding this content ensures that no "holes" in the background layer are exposed when foreground elements are animated. This content may be manually added through the graphics program. For instance, an individual may create the content beneath a given foreground element in order to ensure that as the given foreground element animates, the exposed content not only appears visually consistent but also mimics the artistic style of the underlying art.

Similarly, the animation platform may receive input indicative of a selection of an animation to be performed by each foreground element. In some embodiments, the animation is specified by selecting an animation preset available through the graphics program. In other embodiments, the animation is defined through the graphics program by specifying an appropriate position of the corresponding foreground element in each frame of a series of frames that collectively define the animation.

To create an animated piece of digital art, the animation platform can programmatically associate the animation(s) with the foreground element(s) such that as those animation(s) occur, the content added to the background layer is increasingly revealed. As part of this process, the animation platform may determine an appropriate order and/or rate at which to perform the animation(s). As an example, assume that the digital image includes a tree whose leaves are to fall over an interval of time. Each leaf that falls from the tree will be programmatically associated with an animation. However, all of these animations should not occur at the same time, nor should these animations occur at a fixed rate, if realistic animations are desired. Accordingly, the animation platform may define a temporal schedule for performing the animations. When the animated piece of digital art is shown, the animations are performed in accordance with the temporal schedule. After the conclusion of the temporal schedule, the animations may be executed again, either automatically or upon receiving an instruction to do so.

Embodiments may be described with reference to particular programs, system configurations, art styles, etc. However, those skilled in the art will recognize that these features are similarly applicable to other programs, system configurations, art styles, etc. For example, embodiments may be described in the context of digital images that are representative of high-resolution scans of analog art created using traditional artistic materials. However, the relevant features may be similarly applicable to digital images that are produced through vector graphics programs or raster graphics programs.

While embodiments may be described in the context of computer-executable instructions, aspects of the technologies can be implemented via hardware, firmware, or software. As an example, a set of algorithms indicative of an ML model designed to assist in animating foreground elements of digital art may be executed by an animation platform. The animation platform could be embodied as software that offers support for reviewing, altering, or creating digital images. In particular, the animation platform may prompt a processor to execute instructions for performing the processes described herein.

Terminology

References in this description to "an embodiment" or "one embodiment" means that the particular feature, function, structure, or characteristic being described is included in at least one embodiment. Occurrences of such phrases do not necessarily refer to the same embodiment, nor are they necessarily referring to alternative embodiments that are mutually exclusive of one another.

Unless the context clearly requires otherwise, the words "comprise" and "comprising" are to be construed in an inclusive sense rather than an exclusive or exhaustive sense (i.e., in the sense of "including but not limited to"). The term "based on" is also to be construed in an inclusive sense rather than an exclusive or exhaustive sense. Thus, unless otherwise noted, the term "based on" is intended to mean "based at least in part on."

The terms "connected," "coupled," or any variant thereof is intended to include any connection or coupling between two or more elements, either direct or indirect. The connection/coupling can be physical, logical, or a combination thereof. For example, objects may be electrically or communicatively coupled to one another despite not sharing a physical connection.

The term "module" refers broadly to software components, hardware components, or firmware components. Modules are typically functional components that generate data or some other output based on specified input(s). A program may include one or more modules. Thus, a program may include a series of modules responsible for completing different tasks or a single module responsible for completing multiple tasks.

When used in reference to a list of multiple items, the word "or" is intended to cover all of the following interpretations: any of the items in the list, all of the items in the list, and any combination of items in the list.

The sequences of steps performed in any of the processes described here are exemplary. However, unless contrary to physical possibility, the steps may be performed in various sequences and combinations. For example, steps could be added to, or removed from, the processes described here. Similarly, steps could be replaced or reordered. Thus, descriptions of any processes are intended to be open-ended.

Overview of Animation Platform

FIG. 1 illustrates a network environment 100 that includes an animation platform 102. The animation platform 102 may be compatible with, or executed by, a graphics program 104 through which digital images can be reviewed, edited, or created. Graphics programs (also referred to as "editing programs" or "editing tools") may be designed to handle raster graphics or vector graphics. Examples of graphics programs include Adobe Photoshop®, Adobe Illustrator®, Adobe After Effects®, and the like. Individuals can interact with the animation platform 102 via an interface 106. For example, artists may access the interface 106 to review digital images representative of static pieces of digital art to be animated.

As shown in FIG. 1, the animation platform 102 may reside in a network environment 100. Thus, the animation platform 102 may be connected to one or more networks 108a-b. The network(s) 108a-b can include personal area networks (PANs), local area networks (LANs), wide area networks (WANs), metropolitan area networks (MANs), cellular networks, the Internet, etc. Additionally or alternatively, the animation platform 102 can be communicatively coupled to electronic device(s) over a short-range wireless connectivity technology, such as Bluetooth® or Near Field Communication (NFC). As an example, the animation platform 102 may be executed by a first electronic device through which an artist creates animated media. Moreover, the animation platform 102 may be communicatively connected to a second electronic device that is responsible for presenting the animated media. As discussed above, this second electronic device may be referred to as a "digital frame."

The interface 106 is preferably accessible via a web browser, desktop application, mobile application, or over-the-top (OTT) application. Accordingly, the interface 106 may be viewed on a personal computer, tablet computer, virtual/augmented reality system (e.g., a head-mounted display), and the like.

Some embodiments of the animation platform 102 are hosted locally. That is, the animation platform 102 may reside on the electronic device used to access the interface 106. For instance, the animation platform 102 may be embodied as a desktop application executing on a personal computer. Other embodiments of the animation platform 102 are executed by a cloud computing service operated by, for example, Amazon Web Services® (AWS), Google Cloud Platform™, or Microsoft Azure®. In such embodiments, the animation platform 102 may reside on a network-accessible server system 110 comprised of one or more computer servers. These computer servers can include digital images to be converted into animated media, pieces of animated media, preset animations, algorithms for animating elements, and other assets. Those skilled in the art will recognize that this information could also be distributed amongst an electronic device and a network-accessible server system.

While some embodiments are described in the context of network-accessible interfaces, those skilled in the art will recognize that the interfaces need not necessarily be accessible for a network. For example, an electronic device may execute a self-contained program that does not require network access. Instead, the self-contained program may download necessary assets (e.g., animations, algorithms, or processing operations) at a single point in time or on a periodic basis.

Figure 2:
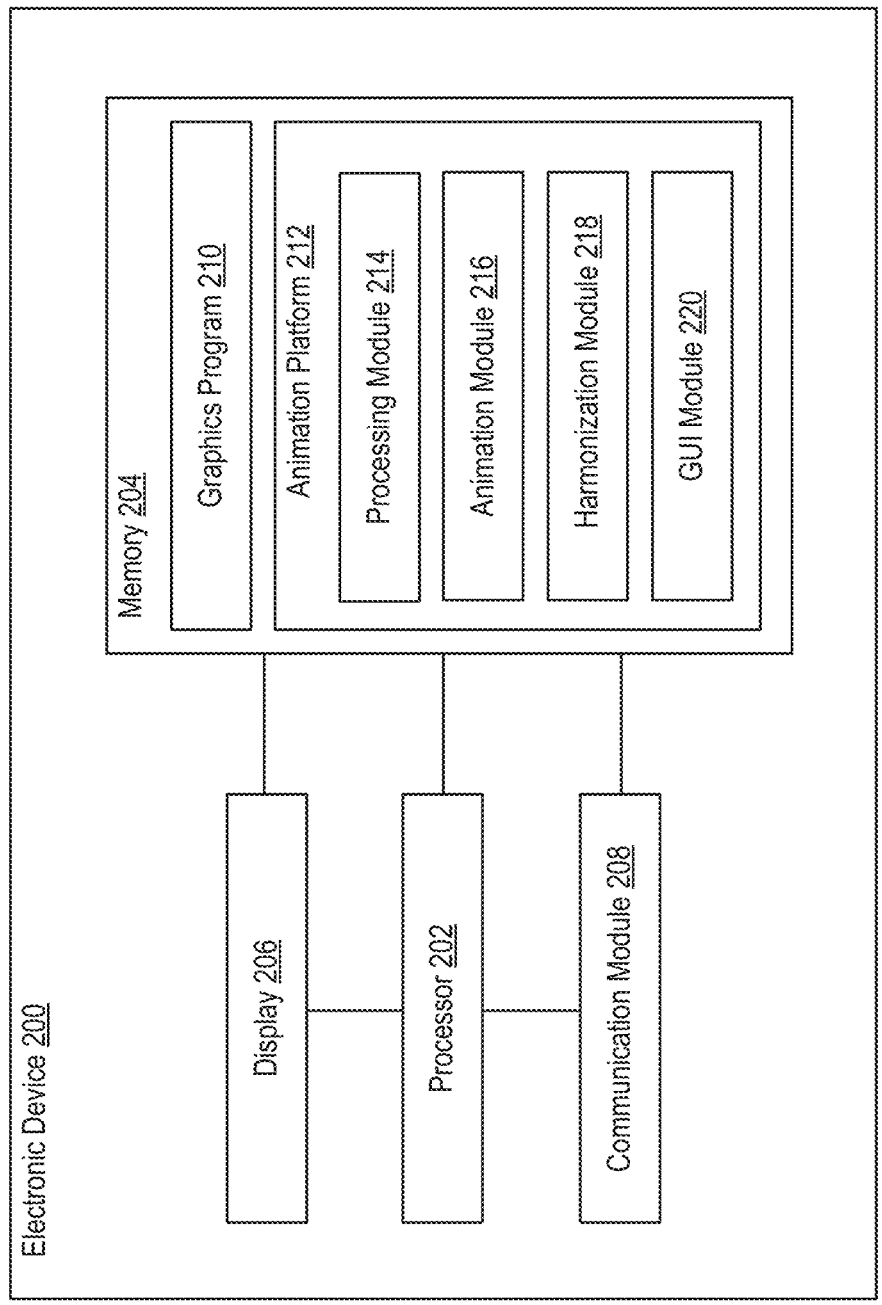
FIG. 2 illustrates an example of an electronic device that includes an animation platform able to assist in the animation of digital art.

FIG. 2 illustrates an example of an electronic device 200 that includes an animation platform 212 able to assist in the animation of digital art. The electronic device 200 can include a processor 202, memory 204, display 206, and communication module 208. The communication module 208 may be, for example, wireless communication circuitry designed to establish wireless communication channels with other electronic devices. Examples of wireless communication circuitry include chips configured for Bluetooth, ZigBee, NFC, and the like. The processor 202 can have generic characteristics similar to general-purpose processors, or the processor 202 may be an application-specific integrated circuit (ASIC) that provides control functions to the electronic device 200. As shown in FIG. 2, the processor 202 can be coupled to all components of the electronic device 200, either directly or indirectly, for communication purposes.

The memory 204 may be comprised of any suitable type of storage medium, such as a static random-access memory (SRAM), dynamic random-access memory (DRAM), electrically erasable programmable read-only memory (EEPROM), flash memory, or registers. In addition to storing instructions that can be executed by the processor 202, the memory 204 can also store data generated by the processor 202 (e.g., when executing the modules of the animation platform 212). Note that the memory 204 is merely an abstract representation of a storage environment. The memory 204 could be comprised of actual memory chips or modules.

The communication module 208 can manage communications between the components of the electronic device 200. The communication module 208 can also manage communications with other electronic devices. For example, the animation platform 212 may reside on a personal computer in the form of a desktop application. In such embodiments, the communication module 208 may communicate with a network-accessible server system responsible for supporting the desktop application. As another example, the animation platform 212 may reside on a computer server of a network-accessible server system. In such embodiments, the communication module 208 can communicate with a program executing on another electronic device. This other electronic device could be associated with an artist interested in generating animated media or a viewer interested in observing animated media.

For convenience, the animated platform 212 may be referred to as a program that resides within the memory 204. However, the animated platform 212 could be comprised of software, firmware, or hardware components implemented in, or accessible to, the electronic device 200. In accordance with some embodiments described herein, the animation platform 212 may include a processing module 214, animation module 216, and harmonization module 218. These modules can be an integral part of the animation platform 212. Alternatively, these modules can be logically separate from the animation platform 212 but operate "alongside" it. For instance, these modules may function as add-ons for the graphics program 210 that resides within the memory 204.

The processing module 214 may be responsible for applying operations to the pixel data of digital images obtained by the animation platform 212. For example, upon receiving input indicative of a selection of a digital image stored in the memory 204, the processing module 214 may process (e.g., denoise, filter, or otherwise alter) the pixel data so that it is usable by the other modules of the animation platform 212. As another example, the processing module 214 may be responsible for identifying candidate elements for animation. For instance, the processing module 214 may apply an ML model designed to identify elements in the digital image that may be candidates for animation based on an analysis of the digital image as a whole. More specifically, the ML model may be designed to label elements in the digital image as being representative of objects and then determine suitability for animation based on those objects. Through training, the ML model may discover which objects are better suited for animation.

The animation module 216 may be responsible for determining whether the elements identified by the processing module 214 are suitable for animating and, if so, which animations are appropriate. As further discussed below, how the animation module 216 accomplishes this may depend on the nature of each element. For example, the animation module 216 may generate an appropriate animation for each element based on a characteristic of that element, such as its dimensions, materials, weight, etc. Thus, the animation module 216 may infer that an element labeled as a snowflake should be animated differently than an element labeled as a raindrop. As another example, the animation module 216 may apply an ML model design to identify an appropriate animation from amongst a library of preset animations based on an analysis of the element. Such an approach may require that the ML model be trained to understand which preset animations are suited for moving water, objects moving along the vertical dimension, objects moving along the horizontal dimension, etc. For instance, the ML model may be able to establish that objects like leaves and snowflakes should have different trajectories when animating than objects like nuts and raindrops.

In some embodiments, the animation module 216 is able to collectively consider all animations associated with a digital image to ensure that sequential execution results in realistic movement. As an example, upon determining that a series of animated elements represent the leaves of a tree, the animation module 216 may infer (e.g., based on ML-based analysis of videos of trees, either live or animated) how the animations should be programmed. For instance, the animation module 216 may determine that the animations should occur regularly but not at a fixed rate. Accordingly, the animation module 216 may produce a temporal schedule indicating when each animation should be performed.

The harmonization module 218 may be responsible for ensuring that content added to the digital image obtained by the animation platform 212 match the artistic style of the digital image. For instance, the harmonization module 218 may apply an ML model designed to review the digital image obtained by the animation platform 212 to discover characteristics such as color range, color palette, textures (e.g., brush marks), stroke width, and then like. Using these characteristics, the ML model may modify the content added to the digital image so that it is visibly similar to the underlying art. A similar process could be performed for animations. That is, the harmonization module 218 may review animations to ensure that, when performed, the animations conform with the artistic style of the underlying art.

Other modules could also be included as part of the animation platform 212. For example, a graphical user interface (GUI) module 220 may be responsible for generating the interfaces through which individuals can interact with the animation platform 212. However, if the animation platform 212 is accessible through, or executed by, the graphics program 210, the GUI module 220 may not be necessary.

Methodologies for Animating Digital Elements

FIG. 3 depicts a flow diagram of a process 300 for animating digital art in a manner that remains faithful to the artistic style of the digital art. Initially, an animation platform can obtain a digital image to be used to create animated media (step 301). Generally, such action is performed responsive to receiving input indicative of a selection of the digital image by an individual. However, the animation platform could be configured to automatically identify the digital image based on, for example, a desired theme or style specified by the individual. For instance, if the individual indicates that she is interested in creating animated media involving nature, the animation platform may review a library of digital images to identify possible candidates.

Thereafter, the animation platform may receive first input indicative of a selection of an element in the digital image to be animated (step 302). As discussed above, the animation platform may cause the digital image to be imported into a graphics program in some embodiments. In such embodiments, the individual may select the element in the graphics program by, for example, defining its outer bounds with an editing tool. Alternatively, the animation platform may employ an ML model that is designed to identify the element based on an analysis of the digital image as a whole. The ML model may include object detection algorithm(s) that are able to identify class(es) of objects in the digital image. For example, if the digital image is classified as relating to nature, the animation platform may apply a ML model having object detection algorithms able to detect instances of leaves, trees, animals, water, clouds, and the like.

Moreover, the animation platform may identify, based on the first input, background content in the digital image that will not be animated (step 303). Generally, the animation platform will infer that all portions of the digital image that are not associated with a selected element are representative of background content (or simply "background"). However, some embodiments of the animation platform may require that the individual expressly indicate which portions of the digital image represent background.

The animation platform can create a layered file in the graphics program by (i) placing the element on a foreground layer and (ii) placing the background on a background layer (step 304). These foreground and background layers may be separately addressable by the graphics program. Thus, when the element is animated along the foreground layer, the background layer may remain substantially static.

Then, the animation platform can receive second input indicative of an addition of content on the background layer directly beneath the element on the foreground layer (step 305). Since the digital image is representative of existing art for which animation was not contemplated, no content exists behind the element. The added content serves to fill the "hole" that will be left when the element is moved through animation. In some embodiments the new content is manually created through the graphics program, while in other embodiments the new content is representative of a high-resolution scan of analog art that is meant to mimic the artistic style of the underlying art.

In some embodiments, the animation platform receives third input indicative of a selection of an animation to be performed by the element (step 306). For example, the individual may select an animation present available through the graphics program. Alternatively, the individual may define the animation through the graphics program by specifying an appropriate spatial position of the element across a series of frames that collectively define the animation. The term "spatial position" or "position" refers to the location and/or orientation of the element with respect to the remainder of the digital image. Thus, the animation platform may create the series of frames by illustrating the element in different locations over an interval of time and then determining, for each frame, whether modification of the element is necessary based on the underlying art. For example, the animation platform may determine whether modifications are necessary so that the animation confirms with the artistic style of the underlying art. These modifications may include changes to lighting, shading, and the like.

The animation platform can then programmatically associate the animation with the element such that as the animation occurs, the new content added to the background layer is at least partially revealed (step 307). As discussed above, the animation may be associated with a temporal trigger that indicates when performance should occur during display of the animated media. For example, the animation platform may specify that the animation should occur a predetermined amount of time (e.g., 30 seconds, 60 seconds, 240 seconds) after the animated media has begun playing in a digital frame.

FIG. 4 depicts a flow diagram of another process 400 for animating digital art. Here, however, multiple elements are to be animated. Initially, an animation platform can receive first input indicative of a selection of a digital image to be used to create animated media (step 401). Upon receiving the first input, the animation platform may cause the digital image to be imported from a memory into a graphics program (step 402). In some embodiments, the memory is accessible to the electronic device executing the graphics program via a network. In other embodiments, the memory is included in the electronic device executing the graphics program.

Thereafter, the animation platform can receive second input indicative of a series of elements in the digital image to be animated (step 403). Step 403 of FIG. 4 may be substantially similar to step 302 of FIG. 3, except here there are multiple elements selected for animation. The animation platform can create a layered file in the graphics program by (i) placing each element on a separate foreground layer such that the series of elements is placed on a series of foreground layers and (ii) placing all remaining content in the digital image on a background layer (step 304). As noted above, these foreground and background layers may be separately addressable by the graphics program. Accordingly, each element may be animated along its corresponding foreground layer.

Then, the animation platform can receive third input indicative of an addition of content on the background layer directly beneath the series of elements (step 405). Step 405 of FIG. 4 may be substantially similar to step 305 of FIG. 3, except here there may be multiple "holes" that are filled with new content.

The animation platform can then assign a series of animations to the series of elements such that each element is assigned an animation (step 406). Generally, the series of elements is assigned an assortment of animations to be performed at various times. For example, each element may be assigned a different animation to be performed at a different time. As another example, each element may be assigned a different animation though some of these animations may be performed at the same time. As discussed above, the series of animations may be assigned to the series of elements by an ML model that is designed to generate a schedule for performing the animations. This schedule may be created so that the series of animations are performed, simultaneously or sequentially, in a natural, realistic manner.

Then, the animation platform can program the series of animations to be performed over an interval of time (step 407). To accomplish this, the series of animations may be assigned temporal triggers that indicate when performance should occur during display of the animated media. For example, the series of animations may be programmed such that a single animation is performed every 30 seconds, 60 seconds, etc. As another example, the series of animations may be programmed such that animations are performed in a more sporadic manner. For instance, a first animation may be performed 18 seconds after the animated media has begun playing, a second animation may be performed 41 seconds after the animated media has begun playing, a third animation may be performed 65 seconds after the animated media has begun playing, etc. As the series of animations is performed, at least some of the new content added to the background layer will be revealed.

FIG. 5 depicts a flow diagram of a process 500 for converting non-animated media into animated media. Steps in the process 500 may be described as being performed by an animation platform or a graphics program. However, as discussed above, the animation platform may be compatible with, or even executed by, the graphics program. In fact, the animation platform may be a component of the graphics program. Accordingly, those skilled in the art will recognize that the steps in the process 500 could be performed by either the animation platform or the graphics program.

Initially, the graphics program can generate an interface through which an individual is able to create animated media (step 501). Thereafter, the graphics program may receive first input indicative of a request to post a digital image to the interface (step 502). For example, the individual may select the digital image from a memory through the interface. After retrieving the digital image, the graphics program can cause display of the digital image by placing corresponding pixels on a first layer addressable by the graphics program (step 503). This first layer may be referred to as a "primary layer," "default layer," or "background layer."

Thereafter, the graphics program may receive second input indicative of a selection of an element in the digital image to be animated (step 504). Step 504 of FIG. 5 may be substantially similar to step 302 of FIG. 3 and step 403 of FIG. 4. Thus, the individual may select the element by defining its outer bounds on the interface with an editing tool. Based on the second input, the graphics program may define a segmented region of pixels corresponding to the element (step 505). Generally, the segmented region of pixels is a contiguous set of pixels that collectively represent the element to be animated. Then, the graphics program can create a layered file by extracting the segmented region of pixels and then placing the segmented region of pixels on a second layer addressable by the graphics program (step 506). This second layer may be referred to as a "secondary layer" or "foreground layer" that lies above the first layer.

The graphics program may receive third input indicative of an addition of content on the first layer within an empty area corresponding to the segmented region of pixels that was extracted (step 507). As discussed above, the added content serves to fill the "hole" that remains on the first layer due to the extraction of the segmented region of pixels.

Then, the animation platform can assign an animation to the element (step 508). As the animation is performed by the element, the segmented region of pixels will move with respect to its original location such that at least some of the new content added to the first layer is exposed. Those skilled in the art will recognize that the segmented region of pixels may also change as the animation is performed. For example, the size, location, and orientation may vary as the element performs the animation. Moreover, the color, hue, and saturation of pixels within the segmented region may vary to simulate changes in, for example, lighting as the animation is performed.

As discussed above, the animation platform may program the animation by assigning a temporal trigger to the segmented region of pixels (step 509). The temporal trigger may indicate the time at which the animation is to be performed, as measured with respect to the runtime of the animated media. That is, the temporal trigger may indicate how soon the animation should be performed after the animated media begins playing. In some embodiments, the animation is programmed by the animation platform based on output produced by an ML model that considers animations, if any, performed by other elements of the digital image. While animations may be assigned temporal triggers in a random or semi-random manner, the ML model may ensure that the animations sufficiently spaced apart so as to appear natural.

These steps may be performed in various sequences and combinations. For example, an individual may select an element in a digital image and then immediately assign that element an animation before beginning the process again (e.g., by selecting another element). Other steps may also be included in some embodiments. For example, the animation platform may create profiles associated with different art styles, artists, environments, and the like. Each profile may specify the types of elements that have been animated in similar digital art and types of animations that have been performed in similar digital art. Moreover, each profile may indicate the execution order/rate of animations performed in similar digital art. As an example, if the animation platform were to determine that a digital image has been classified as relating to nature, the animation platform may examine the nature profile to determine how other digital images related to nature were animated.

EXAMPLES OF ANIMATED MEDIA

Figure 6A:
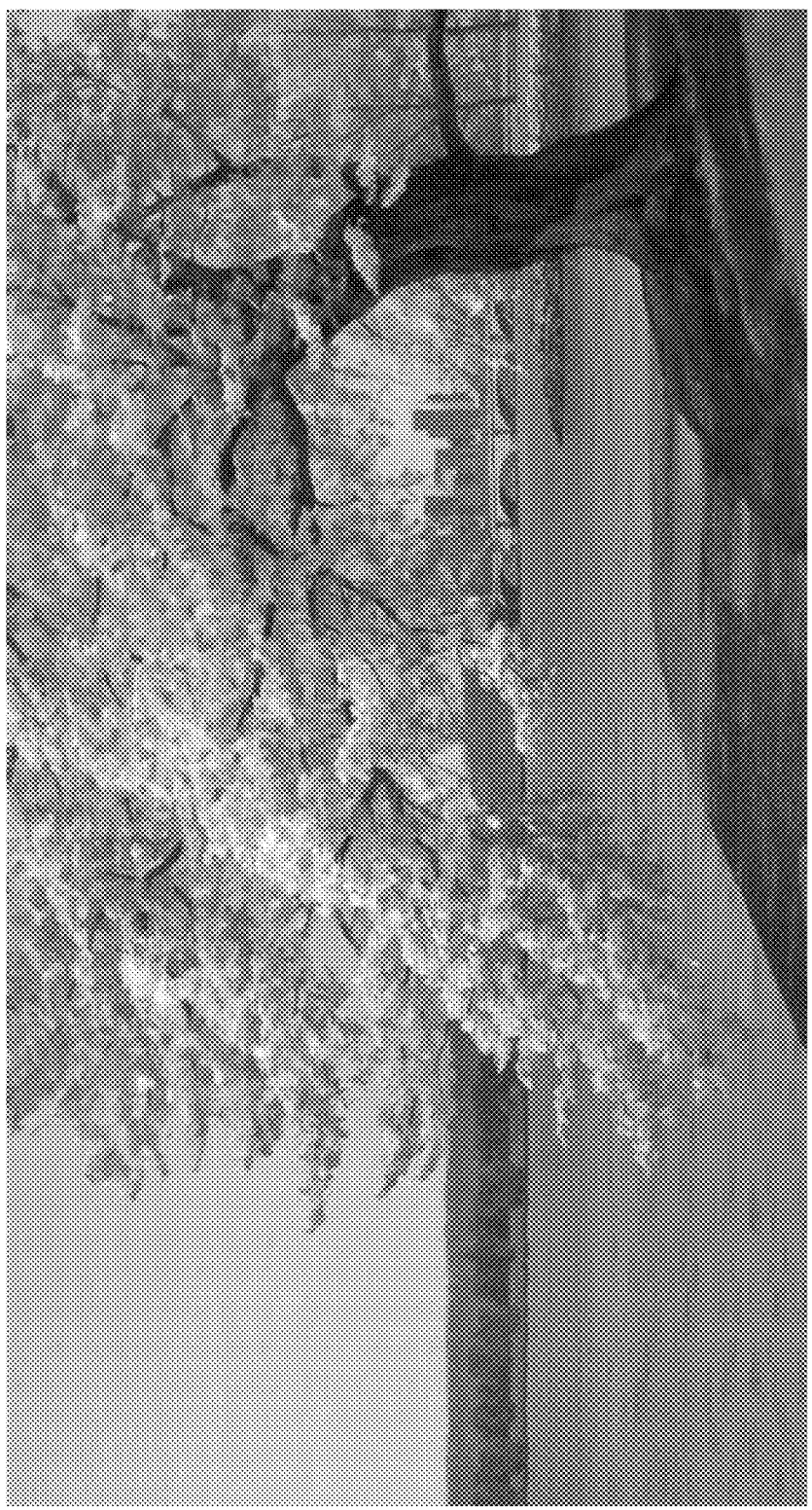
FIGS. 6A-D include several frames from an animated media file illustrating how hundreds or thousands of animations could be performed over time in order to alter the appearance of "Cherry Blossoms" by Bradley Stevens.
Figure 6B:
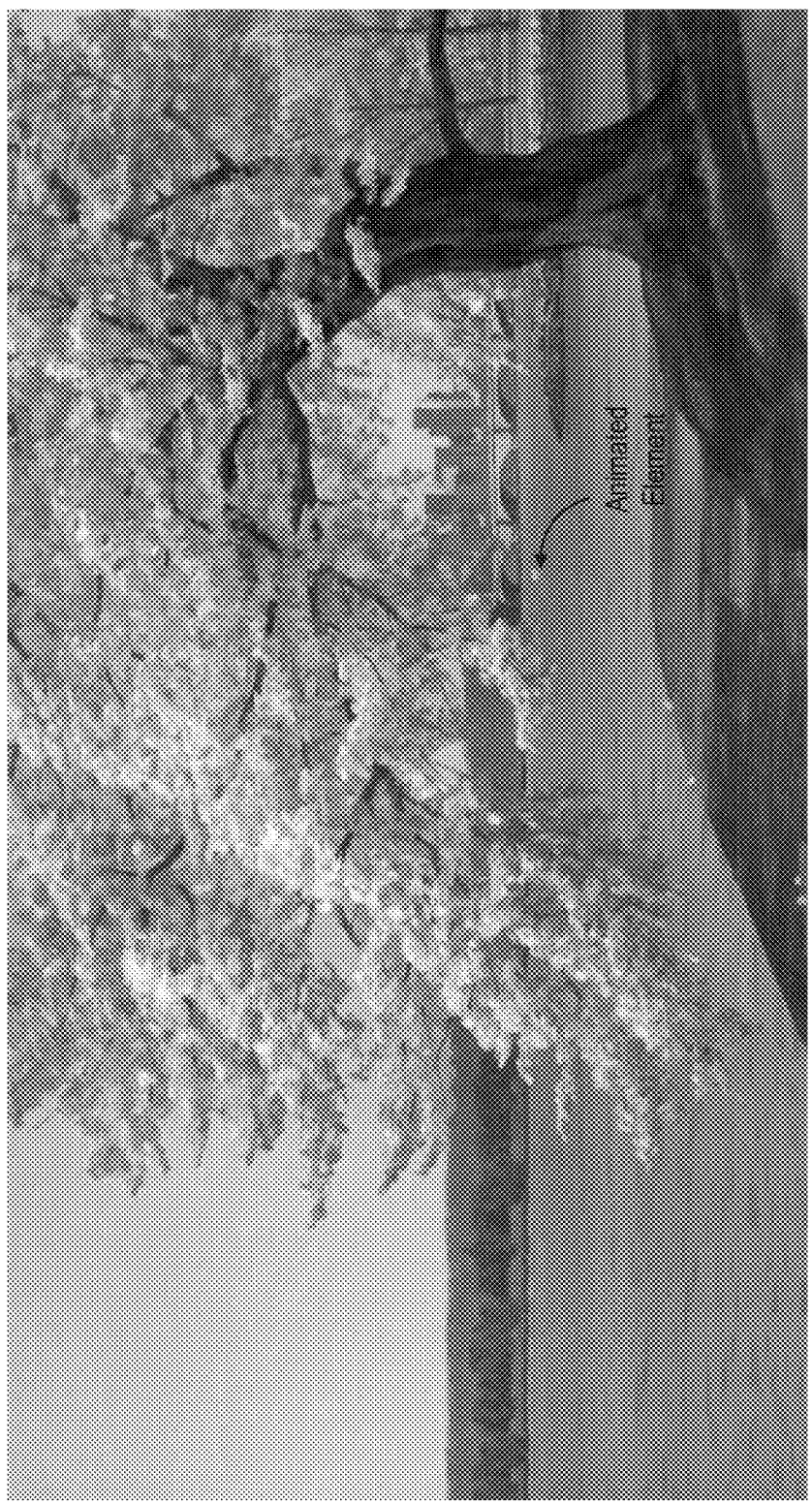
Figure 6C:
Figure 6D:
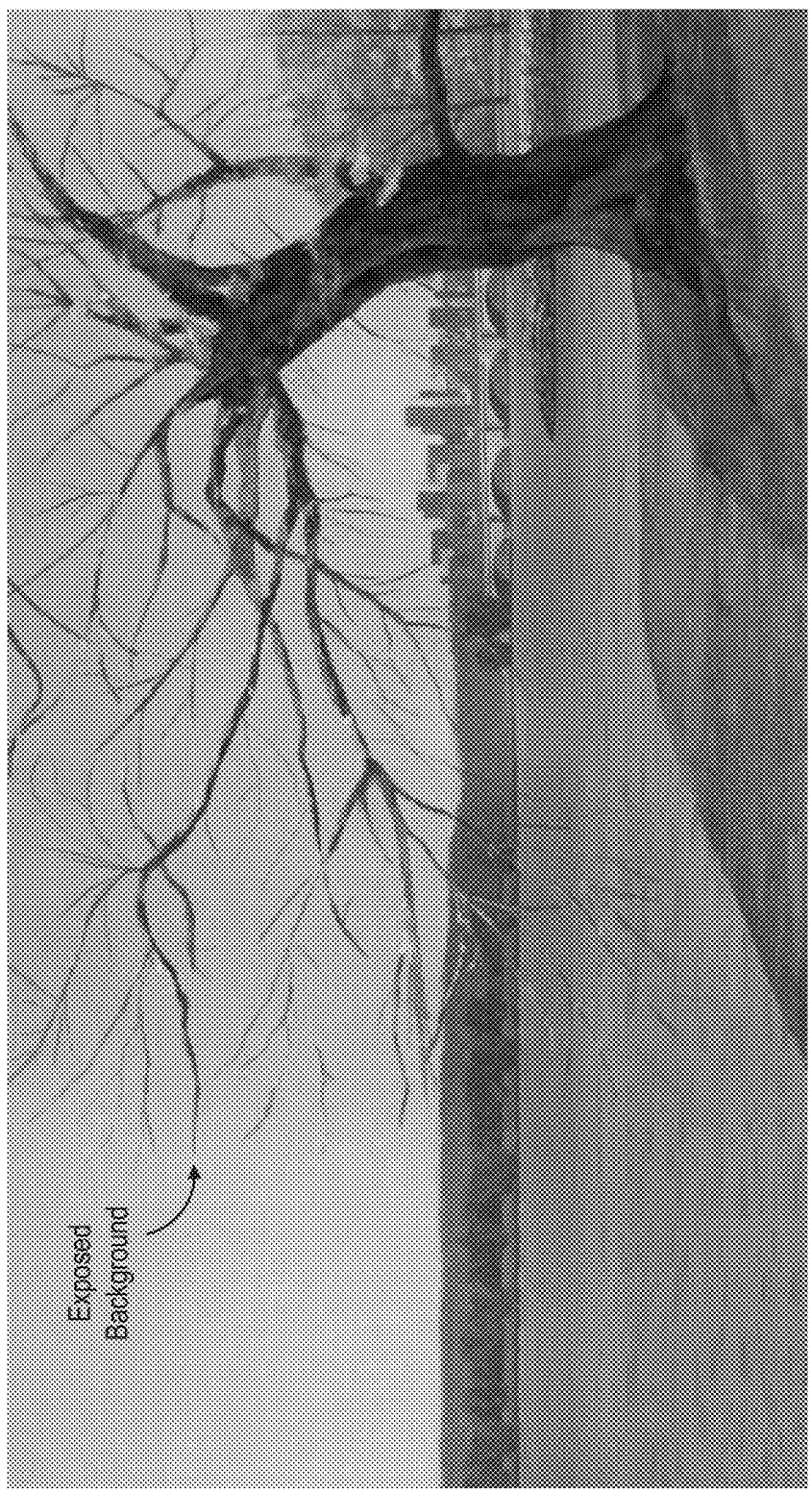

FIGS. 6A-D include several frames from an animated media file illustrating how hundreds or thousands of animations could be performed over time in order to alter the appearance of "Cherry Blossoms" by Bradley Stevens. Here, the original painting is shown in FIG. 6A. FIG. 6B illustrates how animations can be assigned so that the leaves fall from a cherry blossom tree in a consistent-yet-random fashion that is visually realistic. While each leaf may be associated with a different set of start and end locations for the animation, the animations themselves may be selected from preset animations offered by a graphics program. As shown in FIG. 6C, each leaf may be programmed to fall from the cherry blossom tree at a corresponding point in time and then remain in its end location (e.g., on the ground) for a predetermined amount of time. After the predetermined amount of time has elapsed, the leaf may be removed entirely. Over time, more of the content added to the background will be exposed as shown in FIG. 6D. Though this content was not part of the underlying art, it can be made to conform with the artistic style as discussed above.

Figure 7A:
Figure 7B:

FIGS. 7A-C include several frames from an animated media file based on "Green Dress" by Lauren McIntosh. Here, the original painting is shown in FIG. 7A. FIGS. 7B-C illustrate how a team of artists were able to animate aspects of original painting using dozens of hand-drawn sequences. Such an approach enables animations to be performed despite the animated media file appearing like a canvas painting. More specifically, the eyes are animated to shift rightwards as the bush shakes in FIG. 7B, and an animal is shown to be jumping from the bush in FIG. 7C.

Processing System

Figure 8:
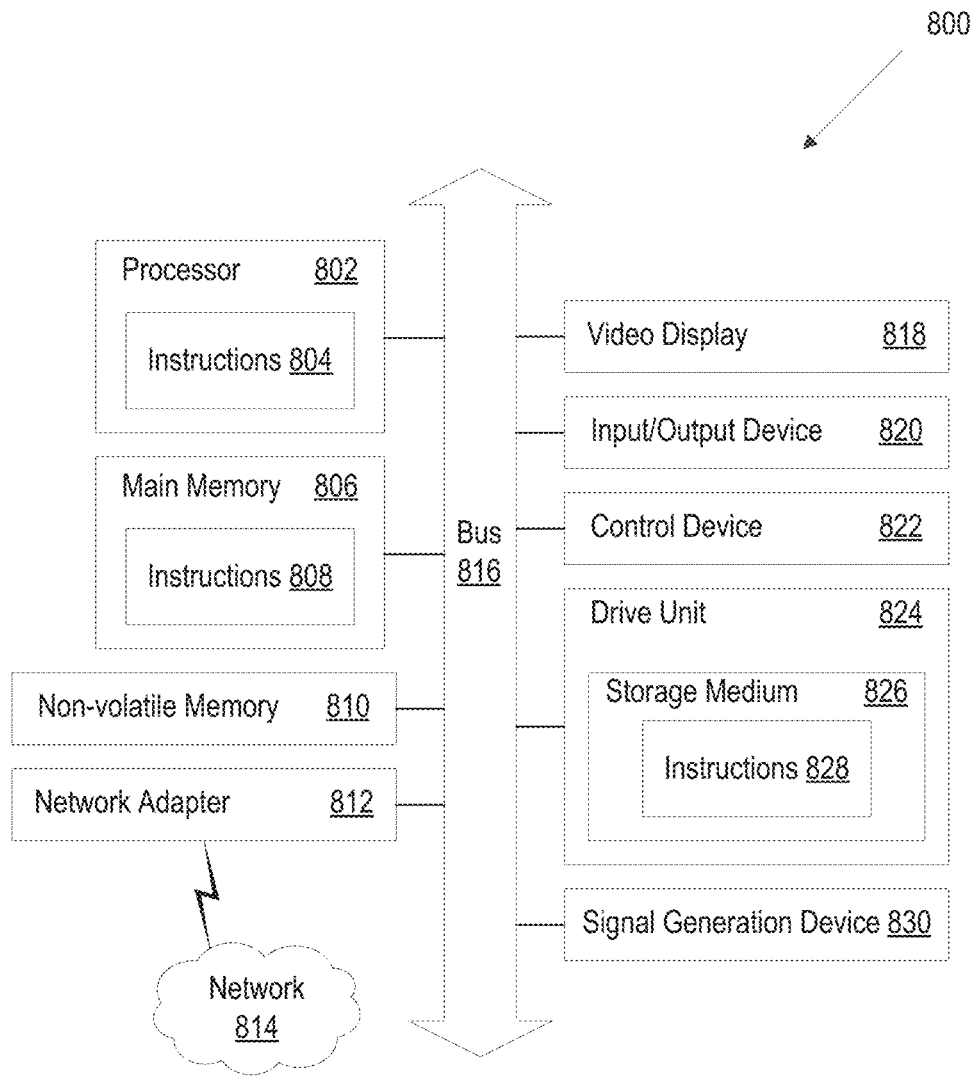
FIG. 8 is a block diagram illustrating an example of a processing system in which at least some operations described herein can be implemented.

FIG. 8 is a block diagram illustrating an example of a processing system 800 in which at least some operations described herein can be implemented. For example, some components of the processing system 800 may be hosted on an electronic device that includes an animation platform (e.g., animation platform 102 of FIG. 1 or animation platform 212 of FIG. 2).

The processing system 800 may include one or more central processing units ("processors") 802, main memory 806, non-volatile memory 810, network adapter 812 (e.g., network interface), video display 818, input/output devices 820, control device 822 (e.g., keyboard and pointing devices), drive unit 824 including a storage medium 826, and signal generation device 830 that are communicatively connected to a bus 816. The bus 816 is illustrated as an abstraction that represents one or more physical buses and/or point-to-point connections that are connected by appropriate bridges, adapters, or controllers. The bus 816 may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus (also referred to as "Firewire").

The processing system 800 may share a similar computer processor architecture as that of a desktop computer, tablet computer, personal digital assistant (PDA), mobile phone, game console, music player, wearable electronic device (e.g., a watch or fitness tracker), network-connected ("smart") device (e.g., a television or home assistant device), virtual/augmented reality systems (e.g., a head-mounted display), or another electronic device capable of executing a set of instructions (sequential or otherwise) that specify action(s) to be taken by the processing system 800.

While the main memory 806, non-volatile memory 810, and storage medium 826 (also called a "machine-readable medium") are shown to be a single medium, the term "machine-readable medium" and "storage medium" should be taken to include a single medium or multiple media (e.g., a centralized/distributed database and/or associated caches and servers) that store one or more sets of instructions 828. The term "machine-readable medium" and "storage medium" shall also be taken to include any medium that is capable of storing, encoding, or carrying a set of instructions for execution by the processing system 800.

In general, the routines executed to implement the embodiments of the disclosure may be implemented as part of an operating system or a specific application, component, program, object, module, or sequence of instructions (collectively referred to as "computer programs"). The computer programs typically comprise one or more instructions (e.g., instructions 804, 808, 828) set at various times in various memory and storage devices in a computing device. When read and executed by the one or more processors 802, the instruction(s) cause the processing system 800 to perform operations to execute elements involving the various aspects of the disclosure.

Moreover, while embodiments have been described in the context of fully functioning computing devices, those skilled in the art will appreciate that the various embodiments are capable of being distributed as a program product in a variety of forms. The disclosure applies regardless of the particular type of machine or computer-readable media used to actually effect the distribution.

Further examples of machine-readable storage media, machine-readable media, or computer-readable media include recordable-type media such as volatile and non-volatile memory devices 810, floppy and other removable disks, hard disk drives, optical disks (e.g., Compact Disk Read-Only Memory (CD-ROMS), Digital Versatile Disks (DVDs)), and transmission-type media such as digital and analog communication links.

The network adapter 812 enables the processing system 800 to mediate data in a network 814 with an entity that is external to the processing system 800 through any communication protocol supported by the processing system 800 and the external entity. The network adapter 812 can include a network adaptor card, a wireless network interface card, a router, an access point, a wireless router, a switch, a multilayer switch, a protocol converter, a gateway, a bridge, bridge router, a hub, a digital media receiver, and/or a repeater.

The network adapter 812 may include a firewall that governs and/or manages permission to access/proxy data in a computer network and tracks varying levels of trust between different machines and/or applications. The firewall can be any number of modules having any combination of hardware and/or software components able to enforce a predetermined set of access rights between a particular set of machines and applications, machines and machines, and/or applications and applications (e.g., to regulate the flow of traffic and resource sharing between these entities). The firewall may additionally manage and/or have access to an access control list that details permissions including the access and operation rights of an object by an individual, a machine, and/or an application, and the circumstances under which the permission rights stand.

The techniques introduced here can be implemented by programmable circuitry (e.g., one or more microprocessors), software and/or firmware, special-purpose hardwired (i.e., non-programmable) circuitry, or a combination of such forms. Special-purpose circuitry can be in the form of one or more application-specific integrated circuits (ASICs), programmable logic devices (PLDs), field-programmable gate arrays (FPGAs), etc.

Remarks

The foregoing description of various embodiments of the claimed subject matter has been provided for the purposes of illustration and description. It is not intended to be exhaustive or to limit the claimed subject matter to the precise forms disclosed. Many modifications and variations will be apparent to one skilled in the art. Embodiments were chosen and described in order to best describe the principles of the invention and its practical applications, thereby enabling those skilled in the relevant art to understand the claimed subject matter, the various embodiments, and the various modifications that are suited to the particular uses contemplated.

Although the Detailed Description describes certain embodiments and the best mode contemplated, the technology can be practiced in many ways no matter how detailed the Detailed Description appears. Embodiments may vary considerably in their implementation details, while still being encompassed by the specification. Particular terminology used when describing certain features or aspects of various embodiments should not be taken to imply that the terminology is being redefined herein to be restricted to any specific characteristics, features, or aspects of the technology with which that terminology is associated. In general, the terms used in the following claims should not be construed to limit the technology to the specific embodiments disclosed in the specification, unless those terms are explicitly defined herein. Accordingly, the actual scope of the technology encompasses not only the disclosed embodiments, but also all equivalent ways of practicing or implementing the embodiments.

The language used in the specification has been principally selected for readability and instructional purposes. It may not have been selected to delineate or circumscribe the subject matter. It is therefore intended that the scope of the technology be limited not by this Detailed Description, but rather by any claims that issue on an application based hereon. Accordingly, the disclosure of various embodiments is intended to be illustrative, but not limiting, of the scope of the technology as set forth in the following claims.

What is claimed is:

1. A method for creating animated media, the method comprising:
    causing display of a digital image on an interface by placing corresponding pixels on a first layer addressable by a computer program;
    receiving first input indicative of a selection of an element in the digital image to be animated;
    creating a layered file for the digital image by—
        extracting a segmented region of pixels corresponding to the element from the first layer, and
        placing the segmented region of pixels on a second layer addressable by the computer program;
    receiving second input indicative of an addition of content on the first layer in an empty area corresponding to the segmented region of pixels; and
    assigning an animation to the element that, when performed, causes the content added to the first layer to be at least partially revealed.

2. The method of claim 1, further comprising:
    programming the animation by assigning a temporal trigger to the segmented region of pixels.

3. The method of claim 2, wherein the temporal trigger indicates a time at which the animation is to be performed as measured with respect to runtime of the animated media.

4. The method of claim 2, wherein said programming is performed based on output produced by a machine learning algorithm that considers animations, if any, performed by other elements of the digital image.

5. The method of claim 1, wherein the digital image is representative of a scan of analog art created using traditional artistic materials.

6. The method of claim 1, wherein the content added to the first layer is generated using the computer program.

7. A non-transitory medium with instructions stored thereon for creating animated media that, when executed by a processor, cause the processor to perform operations comprising:
    receiving first input indicative of a selection of an element in a digital image;
    creating a layered file for the digital image by
        identifying a segmented region of pixels that corresponds to the element,
        extracting the segmented region of pixels from a first layer on which the digital image is placed upon being imported into a computer program, and
        placing the segmented region of pixels on a second layer that is separately addressable by the computer program;
    receiving second input indicative of an addition of content on the first layer in an empty area corresponding to the segmented region of pixels; and
    assigning an animation to the element that, when performed, causes the segmented region of pixels to move with respect to its original location, thereby revealing at least some of the content added to the first layer.

8. The non-transitory medium of claim 7, wherein the first layer is representative of a background layer that remains static during runtime of the animated media, and wherein the second layer is representative of a foreground layer that animates during runtime of the animated media.

9. The non-transitory medium of claim 8, wherein the element is one of multiple elements selected for animation, and wherein each element of the multiple elements is placed on a separate foreground layer positioned above the background layer.

10. The non-transitory medium of claim 7, wherein the operations further comprise:
creating a series of frames that collectively define the animation by illustrating the element in different positions over an interval of time; and
determining, for each frame in the series of frames, how to modify the element such that the animation conforms with the digital image.

11. The non-transitory medium of claim 10, wherein the animation is defined through the computer program by specifying an appropriate position of the element in each frame in the series of frames.

12. The non-transitory medium of claim 7, wherein the operations further comprise:
receiving third input that specifies a temporal trigger that is representative of a time at which the animation is to be performed by the element.

13. The non-transitory medium of claim 12, wherein the time is measured with respect to runtime of the animated media.

14. The non-transitory medium of claim 12, wherein the time is measured with respect to another animation performed by another element in the digital image.

15. A non-transitory medium with instructions stored thereon for creating animated media that, when executed by a processor, cause the processor to perform operations comprising:
receiving first input indicative of a selection of a digital image made through an interface that is generated by a computer program;
causing the digital image to be imported into the computer program, such that corresponding pixels are placed on a first layer that is addressable by the computer program;
establishing that an element in the digital image is to be animated;
identifying a segmented region of pixels that corresponds to the element;
extracting the segmented region of pixels from the first layer;
placing the segmented region of pixels on a second layer that is addressable by the computer program;
receiving second input indicative of an addition of content on the first layer in an empty area corresponding to the segmented region of pixels; and
associating the element with an animation that, when performed, causes at least some of the content added to the first layer to be revealed.

16. The non-transitory medium of claim 15, wherein said establishing is based on a selection of the element that is made through the interface generated by the computer program.

17. The non-transitory medium of claim 15, wherein said establishing is based on an output produced by a machine learning algorithm upon being applied to the digital image.

18. The non-transitory medium of claim 15, wherein the content added to the first layer is representative of a scan of analog art that is meant to mimic an artistic style of the digital image.

19. The non-transitory medium of claim 15,
wherein when performed, the animation causes the content added to the first layer to be increasingly revealed as the segmented region of pixels moves from its original location to a new location, and
wherein when the segmented region of pixels is in the new location, the content added to the first layer is completely revealed.

20. A method comprising:
receiving, by a computer program, input that identifies an element in a digital image that is to be animated;
extracting, by the computer program, pixels that correspond to the element from the digital image, so as to allow the extracted pixels and the remainder of the digital image to be separately addressed by the computer program;
enabling, by the computer program, content to be added to an empty area in the digital image that corresponds to the extracted pixels; and
assigning, by the computer program, an animation to the element that, when performed, causes the content added beneath the extracted pixels to be at least partially revealed.

* * * * *